United States Patent [19]
Katzbeck et al.

[11] 3,944,716
[45] Mar. 16, 1976

[54] ELASTOMERIC CONTAMINATION SEAL

[75] Inventors: John W. Katzbeck, Greensburg; James C. Cron, New Stanton, both of Pa.

[73] Assignee: I-T-E Imperial Corporation, Spring House, Pa.

[22] Filed: Apr. 1, 1974

[21] Appl. No.: 456,901

[52] U.S. Cl.................................. 174/21 R; 174/28
[51] Int. Cl.² .......................................... H02G 15/24
[58] Field of Search..... 174/20, 21 R, 21 C, 21 CA, 174/22 R, 28, 16 B, 10; 29/471.5, 490, 491, 240

[56] References Cited
UNITED STATES PATENTS
3,813,475  5/1974  Cronin ............................. 174/22 C FOREIGN PATENTS OR APPLICATIONS
39,920  1/1937  Netherlands......................... 29/240

*Primary Examiner*—Arthur T. Grimley
*Attorney, Agent, or Firm*—Ostrolenk, Faber, Gerb & Soffen

[57] ABSTRACT

A radial elastomeric seal is disposed between concentric cylindrical members to form a barrier between the interior of the concentric members and the exterior thereof to prevent contamination products from entering the interior of the members during welding of one end of one member to the outer surface of the other.

3 Claims, 4 Drawing Figures

U.S. Patent    March 16, 1976    3,944,716
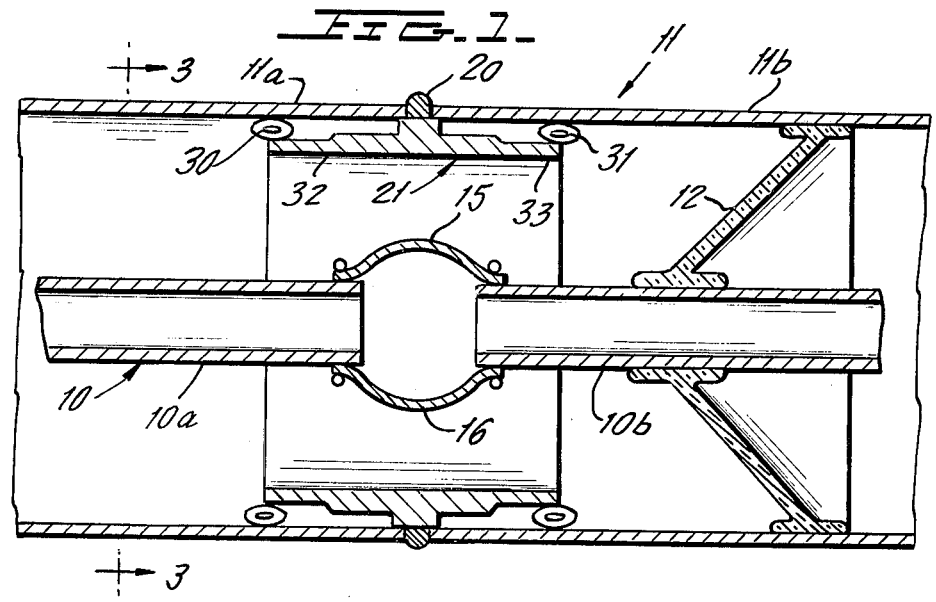
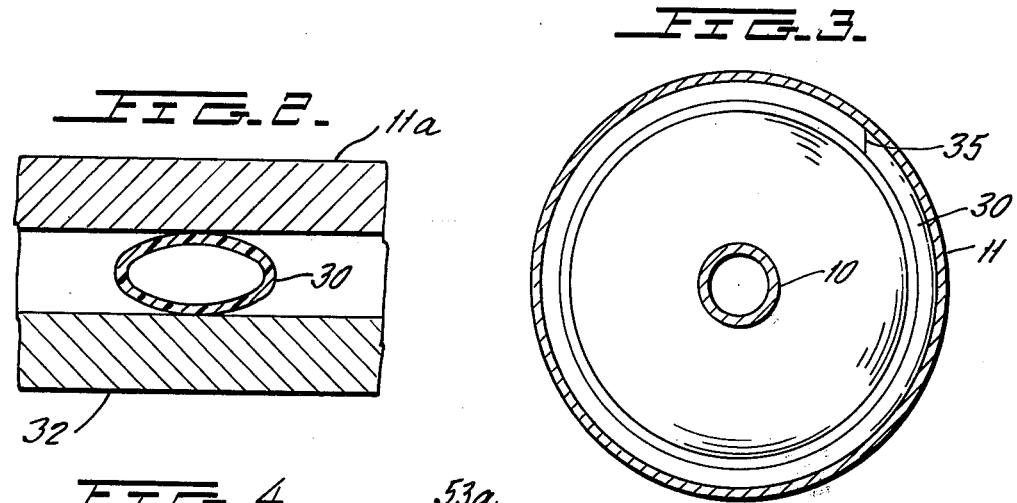
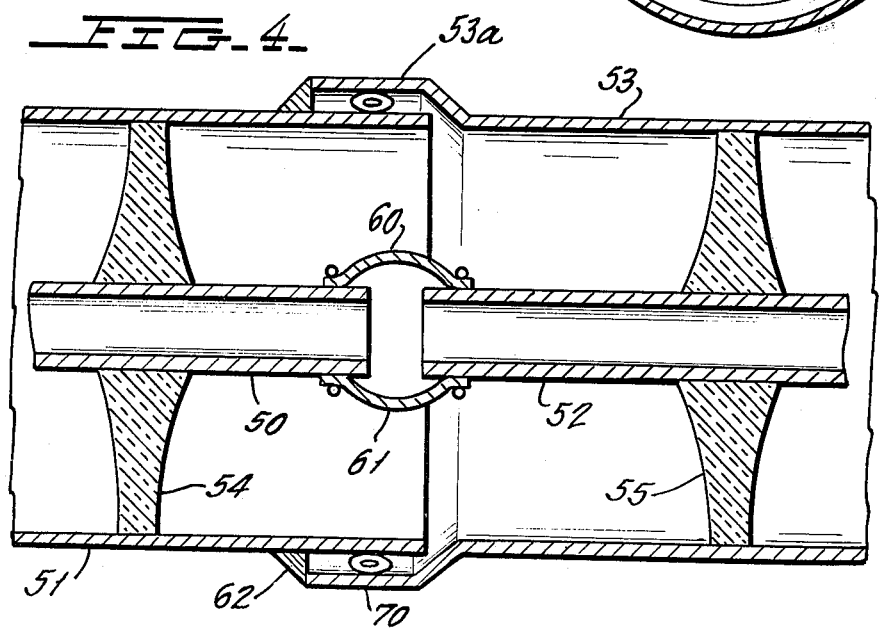

ELASTOMERIC CONTAMINATION SEAL

RELATED APPLICATIONS

This application is related to copending application Ser. No. 362,534, filed May 21, 1973, now U.S. Pat. No. 3,813,475 in the name of John C. Cronin, entitled GROUNDED GAS INSULATED BUS ENCLOSURE - COMBINED ENCLOSURE JOINT BACKUP RING AND CONTAMINATION CONTROL DEVICE, and assigned to the assignee of the present invention.

BACKGROUND OF THE INVENTION

This invention relates to gas-insulated transmission systems, and more specifically relates to a novel elastomeric seal for preventing contamination products from reaching the interior of a gas-insulated transmission system during the welding of the outer housings.

Gas-insulated transmission systems of the type to which the invention applies are shown in the above-noted U.S. Pat. No. 3,813,475 and are generally comprised of an elongated conductor which is supported centrally within a cylindrical grounded housing by means of spaced insulator support devices. The interior of the outer grounded conductive cylinder is then filled with a suitable gas having desired dielectric characteristics, such as sulfur hexafluoride under pressure. The bus is then operated at extremely high voltages, for example, 500 KV. The outer housing of the buses have relatively small diameters, for example, 15 inches. This creates exceptionally high electric fields within the interior of the gas-filled housing so that great caution must be exercised to prevent contamination including moisture, conductive particles, dust and the like from reaching the interior of the bus since the presence of these contaminants can lead to dielectric failure of the bus. Thus, the components which constitute the transmission line must be clean and dry and the gas which fills the housing must also be clean and dry and the housing interior must be free of conductive particles and the like. Conductive particle traps are commonly used along the length of the transmission line and are formed by low field intensity regions which will tend to trap conductive contaminants once these contaminants reach the trap region.

One serious source of contamination of the interior of the grounded housing is the welding process in which outer enclosure sections are welded to one another during the installation of the line. That is, the transmission line is frequently made in discrete lengths which are factory-assembled and then shipped to a site for installation. These factory-assembled sections, which might each be 50 feet long, must then be connected together in the field, and the outer enclosures are commonly welded to one another to form a gas-tight seal and to cause the housing sections to become electrically continuous. During this welding process, weld spatter and other contamination can enter the interior of the housings and can interfere with the electrical performance of the system.

In the past and in order to prevent contamination of the interior of the conductive housing during welding, various attempts have been made to seal the joint before welding as by wrapping insulation tape on the inner member of a telescoping joint; through the use of wiper rings; through the use of solid "O" rings; and through the use of various geometries for the shoulders of the backup welding rings. All of these prior methods had one or more disadvantages. Thus, none were able to accommodate large tolerances and out-of-roundness variations of the sections to be joined. Moreover, some were expensive, as the use of solid O rings, wiper rings or high temperature tape in the joint. The mere use of extended shoulders for the backup rings has the disadvantage in that it is not a positive method for contamination control.

BRIEF SUMMARY OF THE INVENTION

In accordance with the present invention, a novel elastomeric seal, which preferably is formed of a compressible hollow elastomeric tube, is secured in place in a position where it is disposed between the interior of the grounded cylindrical housing and the exterior regions of the housing which are to be welded to the next housing. In one embodiment of the invention, this seal ring is placed around the opposite extensions of a backup weld ring and a butt weld is made between adjacent housing ends. In a second embodiment of the invention, the ring is placed on the straight portion of a "bell and spigot" joint. In either case, the seal is formed around the outer circumference of the inner member of telescoping cylinders and the end of the outer member is welded around a circumference of the inner member. Other types of joints can clearly accommodate the seal of the invention in any desired way.

Once the compressible ring is positioned on one of the elements of the joint, the other is moved into place and the external weld is made. The compressible seal ring is configured so that it will be compressed when the elements of the joint are moved together. Thus, relatively large tolerances and out-of-roundness can be accommodated by the ring because it is hollow and is easily compressed. Note that the annular gap between telescoping members is designed so that the ring will be compressed a given amount when the telescoping members are in position relative to one another.

The compressible ring can be made from long sections of hollow elongated tubing by wrapping tubing around the inner telescoping member and by joining the ends of the tubing as by cementing.

A preferred hollow elastomeric tube, which can be used in accordance with the invention, is of silicone rubber capable of withstanding high temperatures and having an outside diameter of one-fourth inch with a 1/16 inch wall thickness. The ends of the tube can be cut at a 20° angle to the axis of the tube to form a "skiv" joint. The tube ends may then be joined by a suitable silicone rubber adhesive of any commercially available type.

All of the materials used for the seal are preferably materials capable of withstanding the high temperatures produced during the welding of the joint. Clearly, however, any number of materials could be selected and the tube can be formed in any desired way depending upon the particular application to be made of the invention. It is also possible and useful to place an insert in one end of the tube after it is cut to length to aid in alignment of the tube ends when joining the ends.

BRIEF DESCRIPTION OF THE DRAWINGS

FIG. 1 is a longitudinal cross-sectional view through a typical gas-insulated bus system in which the outer conductive housings are welded with a butt joint and which incorporates the novel hollow elastomer tube contamination ring of the invention.

FIG. 2 is an enlarged view in cross-section of the elastomeric ring of the invention compressed between the concentric members being sealed in FIG. 1.

FIG. 3 is a cross-sectional view of FIG. 1 taken across the section lines 3—3 in FIG. 1.

FIG. 4 is a cross-sectional view of the novel elastomeric seal of the invention as applied to a bell and spigot joint.

DETAILED DESCRIPTION OF THE DRAWINGS

Referring first to FIGS. 1 and 3, there is shown therein a conventional type of gas-insulated transmission system in which a central conductor 10 is supported within a grounded conductive housing 11. The interior of housing 11 is then filled with sulfur hexafluoride gas at some desired elevated pressure.

FIG. 1 specifically shows one joint in the elongated system where the system will be formed of a plurality of factory-assembled segments which might be each 50 feet in length and which are assembled at the site of the installation of the transmission system. Note that the bus of FIG. 1 typically will have a diameter of about 15 inches for housing 11 and a diameter of about 5 inches for the hollow conductor 10.

A plurality of insulators, such as conical insulator 12, will be spaced along the length of each section in order to physically support the central conductor relative to the outer grounded housing. Note that conductor 10 and housing 11 may each be formed of aluminum.

FIG. 1 specifically shows the opposite ends of two discrete sections which are connected to one another. Thus, a left-hand section consists of the central conductor 10a and its outer housing 11a, while the right-hand section consists of the central conductor 10b and outer housing 11b. In order to join together the two sections, a suitable sliding type contact arrangement, schematically illustrated by the contact segments 15 and 16, electrically connect central conductors 10a and 10b to one another. The outer housing 11, however, must be gas-tight and conventionally the two housing sections 11a and 11b are secured together and sealed by welding.

In the embodiment of FIG. 1, a butt weld 20 is used in the manner described in U.S. Pat. No. 3,813,475. In forming the butt weld 20, a backup welding ring 21 is used in the manner described in U.S. Pat. No. 3,813,415.

In accordance with the present invention, novel compressible elastomeric sealing tubes 30 and 31 are formed as rings surrounding the end portions 32 and 33, respectively, of backup welding ring 21. The rings 30 and 31 which, in accordance with the invention, are formed of hollow silicone rubber tubing have a diameter of about one-fourth inch and a wall thickness of about 1/16 of an inch. Each of rings 30 and 31 are initially wrapped on end portions 32 and 33 and their ends, which might have been cut at an angle of about 20° to the axis of the tube, are cemented at the joint 35 shown in Fig. 3.

Since tubes 30 and 31 are hollow tubes, they will accommodate relatively large variations in the relative roundness and positions of cylindrical end portions 32 and 33 of weld ring 21 with respect to cylindrical housings 11a and 11b, respectively.

The parts are designed such that the annular gap between the interiors of housings 11a and 11b and the exteriors of ring portions 32 and 33 is about 3/16 of an inch. Thus, when the housings 11a and 11b are telescoped over the weld ring ends 32 and 33, the seals will compress as shown in enlarged view in FIG. 2, thereby to form a tight seal against the passage of contamination products, past rings 30 and 31, and into the interior of housing 11. Thereafter, the butt weld 20 is formed and the unit can be placed into operation, with the assurance that contamination products did not reach the interior of the housing 11 during the welding process.

FIG. 4 illustrates the application of the present invention to a typical bell and spigot type joint. Thus, in FIG. 4 the end of two bus sections are illustrated, where the first bus section consists of central conductor 50 and outer housing 51, while the other bus section consists of central bus 52 and outer housing 53. FIG. 4 also illustrates the use of disk type insulators 54 and 55 for the support insulators within the two bus sections shown in FIG. 4. Clearly, conical insulators could have been used, if desired, or any other type support system could be used.

The central conductors 50 and 52 are then conventionally joined as by a sliding connector containing contact fingers 60 and 61.

The two outer housings 51 and 53 are then arranged such that the end of housing 51 is straight and nests within the enlarged end portion 53a of housing 53. The end of section 53a is then welded by the weld 62 to the outer housing 51 to form a gas-tight seal and to form a continuous electrical path from housing 51 to housing 53.

In accordance with the present invention, an elastomeric seal 70 of hollow material which is identical to the seal used in connection with FIGS. 1, 2 and 3 is disposed between housing 51 and housing portion 53a of housing 53. The gap between the two housings is made smaller than the normal diameter of the seal 70 so that the seal will be compressed to form a good contamination seal between the two housing regions. Moreover, the seal can be even further compressed if necessary to accommodate variations due to tolerances in the manufacture of the housings and to accommodate any out-of-roundness of the two housings.

The seal ring 70 is applied in essentially the same manner as the rings 30 and 31 are applied in FIGS. 1 and 3 and is simply wrapped around the exterior of housing 51 and its ends joined to one another over a suitable joint which could be a skiv joint like the joint 35 of FIG. 3.

Although this invention has been described with respect to preferred embodiments, it should be understood that many variations and modifications will now be obvious to those skilled in the art and, therefore, the scope of this invention is to be limited, not by the specific disclosure herein, but only by the appended claims.

The embodiments of the invention in which an exclusive privilege or property is claimed are defined as follows:

1. In combination, first and second compressible contamination seals, first and second discrete high-voltage gas-filled transmission line sections, and a backup welding ring;

said first and second high-voltage gas-filled transmission line sections each consisting of substantially identical axially aligned first and second outer housings which are cylindrical in cross-section, the ends of said first and second outer housings which face one another being spaced from one another, a weld bead connected between and joining said spaced ends of said first and second housings, an elongated central conductor suspended within said first and second outer housings; said central conductor being generally circular in cross-section, and a plurality of support insulators axially spaced from one another along the axis of said elongated central conductor and connected between said elongated central conductor and said first and second housings suspending said central conductor within said axially aligned first and second outer housings and in insulated relationship therewith;

said backup welding ring comprising a cylindrical ring having a relatively short axial length in comparison to the length of said first and second outer housings and having an enlarged central diameter region axially aligned with said spaced ends of said first and second housings and in contact with the inner diameter of said weld bead, and having first and second end portions which extend axially outward in opposite directions from said enlarged central diameter region and which are respectively disposed within the interior of said first and second housings and which are respectively adjacent said ends of said first and second housings; said first and second end portions of said backup welding ring having identical outer diameters which are radially spaced from the respective surrounding interior diameters of said first and second housings;

said first and second compressible contamination seals respectively secured to and surrounding said backup welding ring first and second end portions and being disposed in respective spaced planes which are perpendicular to the axis of said backup welding ring, and being compressed in the annular spaces between the inner surface of said first and second housings, respectively, and the opposing outer surfaces of said first and second end portions of said backup welding ring; said first and second compressible contamination seals each being axially spaced from said weld bead.

2. The combination of claim 1 wherein the radial dimension of said annular spaces between the opposing surfaces of said first and second housings and said first and second end portions of said backup welding ring is about 3/16 inches, and wherein said first and second compressible contamination seals have a cross-section diameter greater than said radial dimension of said annular spaces.

3. The combination of claim 2 wherein each of said first and second housings have a diameter of about 15 inches and a relatively thin wall thickness, and a length of about 50 feet, and wherein said elongated central conductor has an outer diameter of about 5 inches.

* * * * *

UNITED STATES PATENT OFFICE
CERTIFICATE OF CORRECTION

Patent No. 3,944,716     Dated March 16, 1976

Inventor(s) John W. Katzbeck, et al

It is certified that error appears in the above-identified patent and that said Letters Patent are hereby corrected as shown below:

In the drawing figure which appears on the title page and Figure 1 of the drawings, end portions 32 and 33 should be extended such that sealing tubes 30 and 31 are centrally located with respect to 32 and 33.

In Figure 4, the lead line from 70 should be extended to the sealing tube.

Signed and Sealed this

Sixteenth Day of May 1978

[SEAL]

Attest:

RUTH C. MASON
Attesting Officer

LUTRELLE F. PARKER
Acting Commissioner of Patents and Trademarks